(12) United States Patent
Davis

(10) Patent No.: US 7,043,552 B2
(45) Date of Patent: May 9, 2006

(54) COMMUNICATION DEVICE FOR IDENTIFYING, STORING, MANAGING AND UPDATING APPLICATION AND DATA INFORMATION WITH RESPECT TO ONE OR MORE COMMUNICATION CONTACTS

(75) Inventor: Paul C. Davis, Arlington Hts., IL (US)

(73) Assignee: Motorola, Inc., Schaumburg, IL (US)

( * ) Notice: Subject to any disclaimer, the term of this patent is extended or adjusted under 35 U.S.C. 154(b) by 107 days.

(21) Appl. No.: 10/738,833

(22) Filed: Dec. 17, 2003

(65) Prior Publication Data

US 2005/0138177 A1    Jun. 23, 2005

(51) Int. Cl.
*G06F 15/16* (2006.01)
*G06F 15/173* (2006.01)

(52) U.S. Cl. ............... 709/227; 709/223; 709/226; 709/228; 709/229

(58) Field of Classification Search ............. 709/204, 709/223, 226, 227, 228, 229; 455/419, 466, 455/517, 564
See application file for complete search history.

(56) References Cited

U.S. PATENT DOCUMENTS

2002/0115476 A1*  8/2002  Padawer et al. ........... 455/564
2002/0116459 A1*  8/2002  Zuberec et al. ........... 709/204
2003/0191750 A1* 10/2003  Espino ......................... 707/3
2004/0203942 A1* 10/2004  Dehlin ........................ 455/466
2005/0059418 A1*  3/2005  Northcutt .................... 455/517
2005/0070265 A1*  3/2005  Korpinen .................... 455/419

* cited by examiner

*Primary Examiner*—Rupal Dharia
*Assistant Examiner*—Quang N. Nguyen
(74) *Attorney, Agent, or Firm*—Randi L. Karpinia

(57) ABSTRACT

A communication device (100) includes a communications manager (140) coupled to a contacts memory (155). The contacts memory (155) stores information associated with one or more communication contacts, including a contact identification (200), a contact applications history (210), and contact associated data (215). The contact applications history (210) includes one or more regularly updated applications or associated links historically utilized by a user of the communication device (100) when communicating with the contact. The communications manager (140) is adapted to: identify a communication contact; establish a communication connection with the communication contact; and launch one or more applications stored in the contact applications history (210) using the contact associated data (215) or links to such data for the communication contact in response to the communication connection.

8 Claims, 3 Drawing Sheets

| CONTACT IDENTIFICATION | DISPLAYED NAME | CONTACT APPLICATIONS HISTORY | CONTACT ASSOCIATED DATA |
|---|---|---|---|
| ID 1 | NAME 1 | APPLICATION A | DATA 1A |
| | | APPLICATION B | DATA 1B |
| | | ⋮ | ⋮ |
| | | APPLICATION N | DATA 1N |
| 555-123-4567 | MY BANK | CALCULATOR APP. | |
| | | DOCUMENT APP. | BANK STATEMENT |
| 10-21-345-678 | SUPPLIER L.A. | INVOICE APP. | SUPPLIER L.A. INVOICE |
| | | TRANSLATOR APP. | SPANISH-ENGLISH |
| 800-555-5555 | STOCK BROKER | STOCK APP. | MY STOCKS |
| | | CALCULATOR | |
| | | WEB BROWSER | STOCK WEB PAGE |

*200*  *205*  *210*  *215*

*155*

| CONTACT IDENTIFICATION | DISPLAYED NAME | CONTACT APPLICATIONS HISTORY | CONTACT ASSOCIATED DATA |
|---|---|---|---|
| ID 1 | NAME 1 | APPLICATION A | DATA 1A |
| | | APPLICATION B | DATA 1B |
| | | ... | ... |
| | | APPLICATION N | DATA 1N |
| 555-123-4567 | MY BANK | CALCULATOR APP. | |
| | | DOCUMENT APP. | BANK STATEMENT |
| 10-21-345-678 | SUPPLIER L.A. | INVOICE APP. | SUPPLIER L.A. INVOICE |
| | | TRANSLATOR APP. | SPANISH-ENGLISH |
| 800-555-5555 | STOCK BROKER | STOCK APP. | MY STOCKS |
| | | CALCULATOR | |
| | | WEB BROWSER | STOCK WEB PAGE |

*FIG. 2*

COMMUNICATION DEVICE FOR IDENTIFYING, STORING, MANAGING AND UPDATING APPLICATION AND DATA INFORMATION WITH RESPECT TO ONE OR MORE COMMUNICATION CONTACTS

BACKGROUND OF THE INVENTION

1. Field of the Invention

The present invention is related to communication devices, and more particularly to the management of the operation of the communication device with respect to one or more communication contacts.

2. Description of the Related Art

Cellular telephones, PDAs (Personal Digital Assistants) and other portable electronic devices having communication capability have become fixtures of everyday life over the last several years. As they evolve, prices continue to fall while the devices' capabilities have expanded. Currently, such devices can be used in many places to initiate telephone calls, make wireless connection to the Internet, play games, as well as carry out electronic mail (email) and other messaging functions. It can readily be anticipated that as time goes by, the capabilities of such devices will continue to expand as prices continue to fall, making use of such devices a permanent part of people's daily lives.

SUMMARY OF THE INVENTION

Not Applicable.

As communication devices become increasingly sophisticated, the number of applications and associated data available to users also increases. These additional applications will often be used at the same lime as users are engaged in a primary use of the communication device, such as participating in a telephone call. For example, when on a telephone call with his or her bank, a user may desire to access bank account information. Similarly, when on a telephone call with a supplier, a user may desire to access the supplier information. Launching applications to retrieve such data on communication devices takes time which is especially undesirable when users are paying for communication time increments. Further, the small size of modern communication devices, coupled with the fact that the device is already in use in a primary task (e.g., a telephone call), can make launching secondary applications to retrieve data inefficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

FIG. 2 illustrates an exemplary embodiment of a contacts memory stored within the communication device of FIG. 1.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Users of communication devices often use the same secondary applications and previously stored data each time they interact with a communication contact. The present invention, as described herein provides a communication device and method of operation which associate stored historically utilized applications and previously utilized data for each of the applications with various individual communication contacts, providing immediate availability of both the most recently used data and the historically utilized applications to the user during a communication with that individual communication contact.

Figure 1:
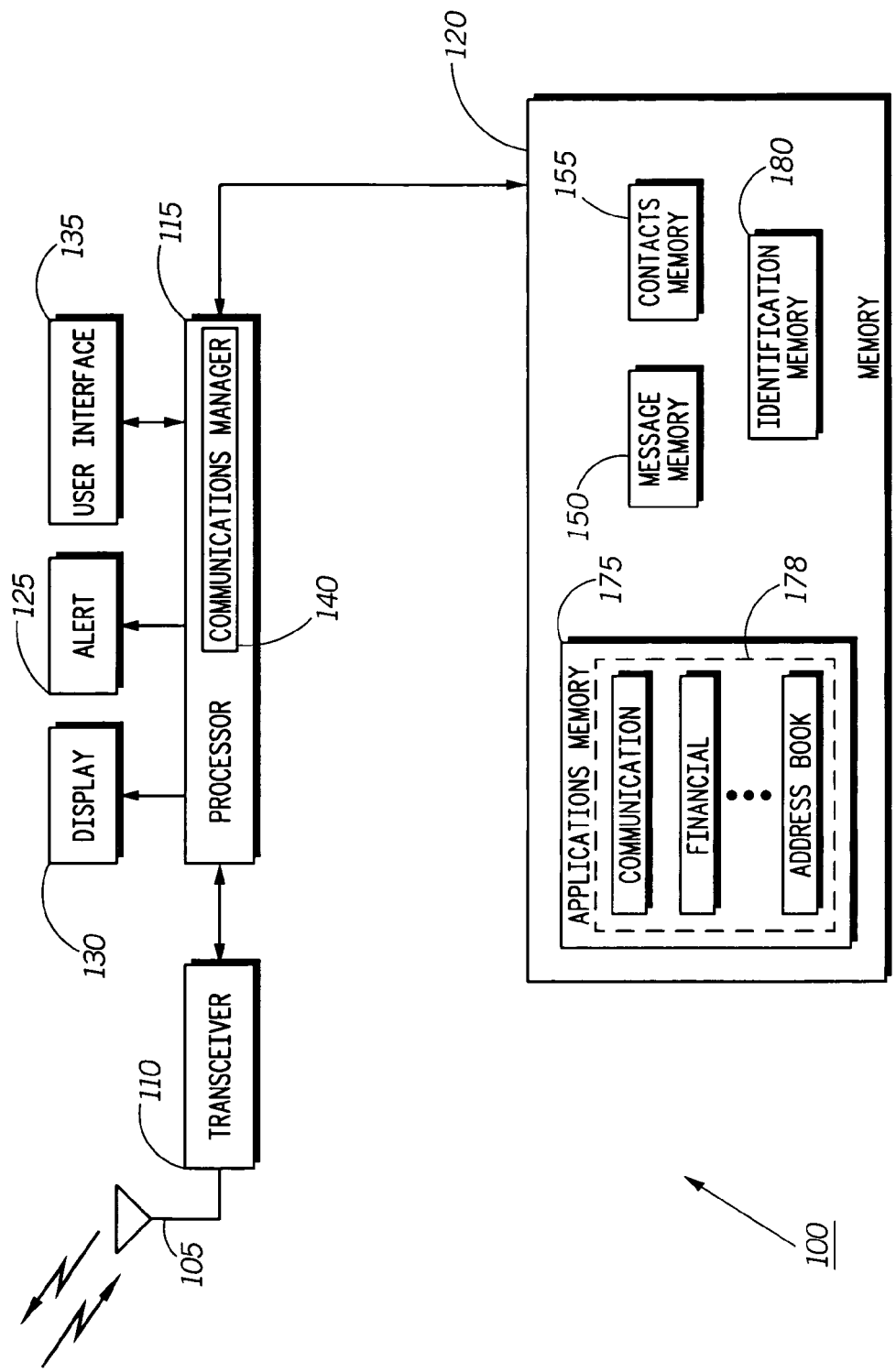
FIG. 1 illustrates one embodiment of a communication device.

FIG. 1 is an electronic block diagram of a communication device 100. It will be appreciated by one of ordinary skill in the art that the communication device in accordance with the present invention can be a personal computer, a personal digital assistant, or the like having communications capability. Further, it will be appreciated by one of ordinary skill in the art that the communication device, in accordance with the present invention, can be a mobile cellular telephone, a mobile radio data terminal, a mobile cellular telephone having an attached data terminal, or a two way messaging device. Further, the communication device 100 can be a small portable personal computer having wireless communications capability. In the following description, the term "communication device" refers to any of the devices mentioned above or an equivalent.

As illustrated, the communication device 100 preferably includes an antenna 105, a transceiver 110, a processor 115 including a communications manager 140, a memory 120, an alert 125, a display 130, and a user interface 135.

The antenna 105 intercepts transmitted signals from one or more communication systems and transmits signals to the one or more communication systems. It will be appreciated by those of ordinary skill in the art that one or more of the communication systems, in accordance with the present invention, can function utilizing any wireless radio frequency (RF) channel, for example, a two-way messaging channel, a mobile cellular telephone channel, or a mobile radio channel. Similarly, it will be appreciated by one of ordinary skill in the art that one or more of the communication systems can function utilizing other types of wireless communication channels, such as infrared channels and/or Bluetooth channels. Similarly, it will be appreciated by one of ordinary skill in the art that one or more of the communication systems can function utilizing a wire line communication channel, such as a local area network (LAN), a wide area network (WAN), or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures. The WAN, for example, can use a physical network media, such as X.25, Frame Relay, ISDN, Modem dial-up or other media. In the following description, the term "communication system" refers to any of the communication systems mentioned above or an equivalent. Further, in the following description, the term "communication device" refers to any device operating within the communication systems mentioned herein or an equivalent.

The antenna 105 is coupled to the transceiver 110, which employs conventional demodulation techniques for receiving the communication signals and conventional modulation techniques for transmitting the communication signals. The transceiver 110 is coupled to the processor 115 and is responsive to commands from the processor 115. When the transceiver 110 receives a command from the processor 115, the transceiver 110 sends a signal via the antenna 105 to one or more of the communication systems. In an alternative embodiment (not shown), the communication device 100 includes a receive antenna and a receiver for receiving signals from one or more of the communication systems and a transmit antenna and a transmitter for transmitting signals to one or more of the communication systems. It will be appreciated by one of ordinary skill in the art that other similar electronic block diagrams of the same or alternate type can be utilized for the communication device 100.

Coupled to the transceiver 110 is the processor 115 utilizing conventional signal-processing techniques for processing received and transmitted messages. It will be appreciated by one of ordinary skill in the art that additional processors can be utilized as required to handle the processing requirements of the processor 115. The processor 115 decodes an identification in the demodulated data of a received message, compares the decoded identification with one or more identifications stored in an identification memory 180 of the memory 120, and when a match is detected, proceeds to process the remaining portion of the received message. Each of the identifications, for example, can be a unique selective call address assigned within a wireless communication system, an electronic mail address, an IP (internet protocol) address or any other similar identification.

To perform the necessary functions of the communication device 100, the processor 115 is coupled to the memory 120, which preferably includes a random access memory (RAM), a read-only memory (ROM), and an electrically erasable programmable read-only memory (EEPROM)(not shown). It will be appreciated by those of ordinary skill in the art that the memory 120 can be integrated within the communication device 100, or alternatively, can be at least partially contained within an external memory, such as a memory storage device (not shown). The memory storage device, for example, can be a subscriber identification module (SIM) card. A SIM card is an electronic device typically including a microprocessor unit and a memory enscapsulated within a small flexible plastic card. The SIM card card additionally includes some form of interface for communicating with the communication device 100. The SIM card can be used to transfer a variety of information from/to the communication device 100 and/or any other compatible device. Preferably, the memory 120 includes the identification memory 180, a message memory 150, a contacts memory 155, and an applications memory 175.

The applications memory 175 comprises one or more memory locations within the memory 120 for storing one or more applications 178 for use in the operation of the communication device 100. The applications 178 can include, for example communication functionality, such as for messaging, voice calls, electronic mail and Internet browsing. The applications 178 can further include calculator functions, stock market analysis, financial analysis, and tax calculation. The applications 178 can further include address books, language translators, dictionaries, schedulers, stock managers, weather alerts, traffic reports and news briefs. It will be appreciated by one of ordinary skill in the art that each of the applications 178 can include any of the applications mentioned above or an equivalent.

FIG. 2 illustrates an exemplary embodiment of the contacts memory 155. As illustrated, the contacts memory 155 stores information associated with one or more communication contacts. Specifically, for each of a plurality of stored contacts, a contact identification 200, a displayed name 205, a contact applications history 210, and contact associated data 215 is stored. The contact identification 200 can be, for example, be one or more identifications stored in the identification memory 180. For example, the contact identification 200 can be a telephone number, a unique selective call address assigned within a wireless communication system, an electronic mail address, an IP (internet protocol) address or any other similar identification. The displayed name 205 can be a caller identification, including written text and/or graphical images, which can be displayed on the display 130 to identify the communication contact. The contact applications history 210 stores one or more applications historically utilized by the user of the communication device 100 when communicating with the contact. Alternatively, the contact applications history 210 stores a link, a pointer, an identification, or other equivalent identifier to each of the historically utilized applications. The utilization can be frequency of use, timeframe of use, and the like. In one embodiment (not shown), the utilization can be a category of the contact in which one or more applications are associated with that category. It will be appreciated by those of ordinary skill in the art that the contact applications history 210 can store all applications utilized when communicating with that contact. Alternatively, the contact applications history 210 can store a portion of the applications or an identifier for a portion of the applications utilized using a predetermined set of user-determined preferences. For example, the portion can be the top three most often used applications, the applications used in the past year, and the like. Using the most recent applications, most frequent applications, or a combination of the two to determine the best applications to launch are all within the scope of the present invention. The contact associated data 215 stores contact specific data for each of the applications stored within the contact applications history 210 for that contact. Alternatively, the contact associated data 215 can be stored in an alternative memory location within the memory 120 and a link, a pointer, an identification, or other equivalent identifier to each portion of the contact associated data 215 can be stored within the contacts memory 155.

As an example of the information stored within the contacts memory 155, when the contact identification 200 is the user's bank telephone number, the displayed name 205 may be "My Bank." The contact applications history 210 may include a calculator application and a document application in which the contact associated data 215 for the document application includes the user's most recent bank statement. As another example, when the contact identification 200 is a telephone number for a user's Latin American supplier, the displayed name may be "Supplier L.A." The contact applications history 210 may include an invoice application with contact associated data 215 being the Latin American supplier's most recent invoice; and may include a translator application with contact associated data 215 being Spanish to English indication. As another example, when the contact identification 200 is the user's stockbroker, the displayed name 205 may be "stockbroker." The contact applications history 210 may include a stock application with the contact associated data 215 being the user's stocks, a calculator application, and a web browser application with the contact associated data 215 being the URL (Uniform Resource Locator) for the user's account within the stockbroker's web page.

Referring back to FIG. 1, upon receipt and processing of a message or a call, the processor 115 preferably generates a command signal to the alert 125 as a notification that the message has been received and stored or alternatively that a call is waiting for a response. The alert 125 similarly can be utilized for other alerting notifications such as an alarm clock, a calendar event alert, an alert notification that a communication call has been disconnected or has failed, an alert indication that a communication number has been stored within the contacts memory 155, an alert notification that the message memory 150 is at its memory storage limitations, or the like. The alert 125 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs herein described can be used for the alert 125.

Upon receipt and processing of a message or a received call, the processor 115 preferably also generates a command signal to the display 130 to generate a visual notification. Similarly, the display 130 can be utilized as a means for providing information to the device user. For example, various graphical images associated with one or more applications stored within the applications memory 175 can be displayed on the display 130. The display can be a liquid crystal display, a cathode ray tube display, one or more organic light emitting diodes (LEDs), one or more LEDs, a plasma display, or an equivalent.

Preferably, the user interface 135 is coupled to the processor 115. The user interface 135 can include a keypad such as one or more buttons used to generate a button press or a series of button presses. The user interface 135 can also include a voice response system or other similar method of receiving a manual input initiated by the device user. The processor 115, in response to receiving a user input via the user interface 135, performs commands as required. For example, the user interface 135 can be utilized for performing functions related to the messages stored in the message memory 150, such as reading, replying, or deleting one or more stored messages. The user interface 135 can further be used to perform functions on one or more contacts stored in the contacts memory 155, such as accessing, adding, deleting, or changing information related to one or more contacts. The user interface 135, in conjunction with the display 130 and/or the alert 125 can further be used to access the contacts memory 155 for finding one or more contact numbers with which to initiate a communication.

In a preferred embodiment, the processor 115 includes the communications manager 140. It will be appreciated that the communications manager 140 can alternatively be separately coupled to the processor 115 (not shown). The communications manager 140 can be hard coded or programmed into the communication device 100 during manufacturing, can be programmed over-the-air upon customer subscription, or can be a downloadable application. It will be appreciated that other programming methods can be utilized for programming the communications manager 140 into the communication device 100. It will be further appreciated by one of ordinary skill in the art that the communications manager 140 can be hardware circuitry within the communication device 100. The communications manager 140 preferably provides intelligent communication management for the communication device 100. The communications manager 140 preferably provides management of the plurality of communication contacts and their associated data 215 stored in the contacts memory 155.

Figure 3:
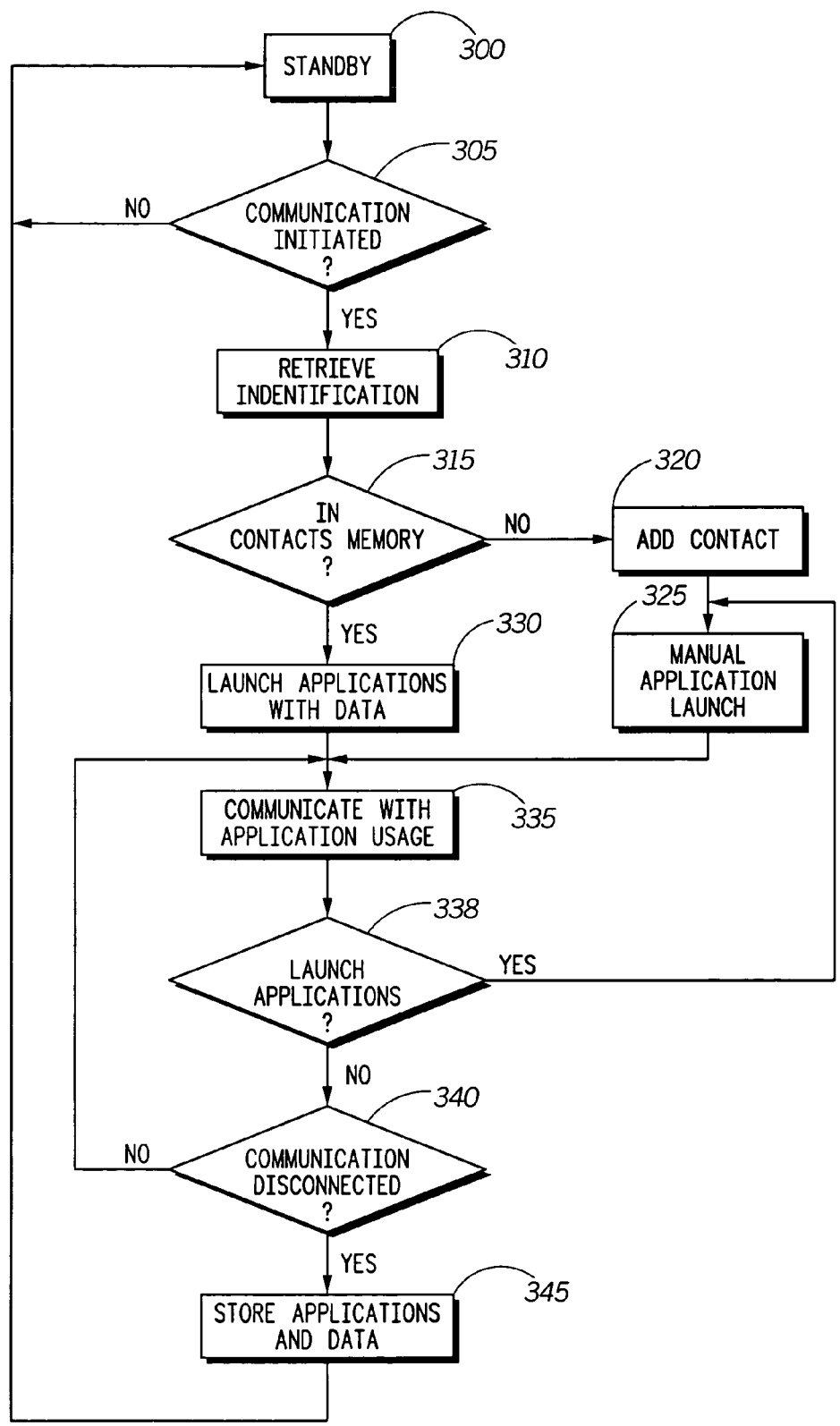
FIG. 3 illustrates one embodiment of the operation of the communication device of FIG. 1.

FIG. 3 illustrates one embodiment of the operation of the communication device 100 of FIG. 1. Specifically, FIG. 3 illustrates one embodiment of the operation of the communications manager 140. As illustrated, the process begins with Step 300 in which the communication device 100 is in standby mode. Standby mode runs the communication device 100 with minimal power to conserve battery life. Next, in Step 305, the process determines whether or not a communication has been initiated. For example, the communications manager 140 can receive a signal from the processor 115 indicating that a communication connection has been established due to the communication connection being initiated by the device user. Similarly, the communications manager 140 can receive an indication that a communication has been received by the communication device 100 indicating the establishment of a communication connection with a communication contact. When a communication has not been initiated in Step 305, the process cycles back to the standby mode of Step 300.

When a communication has been initiated in Step 305, the process continues with Step 310, in which identification information associated with the communication contact for which communication has been initiated is retrieved. In one embodiment, contact metadata can be obtained at the beginning of the communication. Broadly, metadata is data about data, or information about information. In practice, metadata comprises a structured set of descriptive elements to describe an information resource or, more generally, any definable entity, such as a communication contact. For example, on outgoing telephone calls, metadata may comprise names or numbers used. Analogously, on incoming phone calls, metadata may be derived by making use of information from contact identifications 200 stored in the contacts memory 155. For example, a received voice call can include the originator's telephone number. Similarly, a received message can include the originator's address. Further, an initiated communication can identify the communication contact for which communication is being established. The operation continues next to Step 315, in which the communications manager 140 determines whether or not the communication contact is stored within the contacts memory 155. For example, the communications manager 140 can compare the communication contact identification to the various stored contacts and associated contact identifications, thereby determining whether or not a match exists.

When the communication contact is not stored within the contacts memory 155 in Step 315, the operation continues to Step 320, in which the communication contact is added to the contacts memory 155. For example, the contact identification and 200 and the displayed name 205 for the communication contact can be stored. Next, in Step 325, the user is given the opportunity to manually select one or more applications to launch. It will be appreciated by those of ordinary skill in the art that Step 325 can be skipped if the user does not wish to launch any applications. The manual operation by the user typically includes using the user interface 135 to select one or more applications.

When the communication contact is stored within the contacts memory 155 in Step 315, the operation next continues to Step 330, in which one or more applications stored or recorded or otherwise identified within the contact applications history 210 and associated contact data 215 are identified, readied, and typically launched. In other words, in Step 330, the applications previously used when interacting with the communications contact can be automatically invoked the next time the device user and the communications contact interact. Thus, the device user need not be bothered with the effort of finding, selecting, and launching the applications. In one embodiment, links to applications and associated data can be provided, instead of full application launches. While there is no guarantee that a device user will always need the same applications and data in each interaction with a communications contact, the present invention makes use of information provided in the context regarding prior application use, in order to determine the appropriate applications to launch. It will be appreciated by those of ordinary skill in the art that the automatic launching of applications in Step 330 can be a user preference which users can toggle on and off (not shown).

Next, and after Step 325, the operation continues to Step 335 in which the communication between the device user and the communications contact is accomplished in conjunction with the utilization of the associated applications. The operation then continues to Step 338, in which the communications manager 140 determines whether the device user desires to manually launch one or more applications. For example, a user input via the user interface 135 can indicate a desire to manually launch one or more applications which were not launched or are not active from earlier communication cycles during the same connection. When such a user input is detected in Step 338, the operation continues to Step 325 in which the applications are manually launched.

When no such user input is detected in Step 338, the operation continues to Step 340. In Step 340, the process determines whether the communication has been disconnected. For example, the originator or recipient of the communication can end the connection by hanging up. When the communication has not been disconnected, the operation cycles back to Step 335 and the communication continues. When the communication has been disconnected in Step 340, the operation continues to Step 345, in which the utilized applications, or a record or identifier of utilized applications, and associated contact data, or a record or identifier of associated contact data, are stored/updated within the contacts memory 155. The operation then cycles back to standby mode of Step 300.

The present invention provides a means and method to (1) identify, store, manage, and update application and data information for each communication contact for a communication device user, and (2) use new identifying communication contact information in conjunction with this context to launch appropriate applications when new interactions begin.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device for communicating with one or more communication contacts, the communication device comprising:
   a contacts memory for storing information associated with one or more communication contacts, wherein the stored information for each of the communication contacts comprises:
      a contact identification,
      a contact applications history comprising links to one or more applications historically utilized by a user of the communication device when communicating with the particular communication contact, and
      contact associated data for each of the applications stored within the contact applications history; and
   a communications manager coupled to the contacts memory and operable to:
      manage the stored information of the contacts memory;
      establish a communication connection with a communication contact;
      launch at least a first application in response to the communication connection;
      determine whether a link to the first application is currently associated with the communication contact in the contact applications history; and
      store a link to the first application in the contact applications history in the event that the link to the first application is not currently associated with the communication contact.

2. The communication device as defined in claim 1, further comprising:
   an applications memory, coupled to the communications manager, for storing the one or more applications,
   wherein the links to the one or more applications stored within the contact applications history point to locations within the applications memory at which the one or more applications are stored.

3. The communication device as defined in claim 1 wherein the contact identification is an identification selected from a group consisting of a telephone number, a selective call address, an electronic mail address, and an internet protocol address.

4. The communication device as defined in claim 1, wherein the contact applications history stores the one or more applications based on a utilization selected from a group consisting of a frequency of use, a timeframe of use, a contact category, and one or more user-determined preferences.

5. The communication device as defined in claim 2, wherein the communications manager is further operable to:
   automatically launch at least a second application stored within the applications memory in response to the communication connection.

6. The communication device as defined in claim 1, wherein the communications manager is further operable to:
   establish a second communication connection with the communication contact; and
   automatically launch at least the first application in response to the second communication connection.

7. The communication device as defined in claim 6, wherein the communications manager is further operable to launch at least a second application during at least one of the first communication connection and the second communication connection responsive to input from a user of the communication device.

8. The communication device as defined in claim 1, wherein the communications manager is further operable to determine whether a link to the first application is currently associated with the communication contact in the contact applications history performed upon completion of the communication connection.

* * * * *